(12) United States Patent
Jenkins

(10) Patent No.: US 7,630,002 B2
(45) Date of Patent: Dec. 8, 2009

(54) SPECULAR REFLECTION REDUCTION USING MULTIPLE CAMERAS

(75) Inventor: David R. Jenkins, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 379 days.

(21) Appl. No.: 11/620,591

(22) Filed: Jan. 5, 2007

(65) Prior Publication Data

US 2008/0165266 A1 Jul. 10, 2008

(51) Int. Cl.
- *H04N 5/225* (2006.01)
- *H04N 5/66* (2006.01)
- *G06F 3/041* (2006.01)
- *G06F 3/042* (2006.01)

(52) U.S. Cl. ............... 348/218.1; 348/739; 345/173; 345/175

(58) Field of Classification Search ............. 345/173, 345/175; 348/218.1, 207.99, 739
See application file for complete search history.

(56) References Cited

U.S. PATENT DOCUMENTS

| | | | |
|---|---|---|---|
| 4,972,093 A | 11/1990 | Cochran et al. | |
| 5,515,452 A | 5/1996 | Penkethman et al. | |
| 5,684,530 A | 11/1997 | White | |
| 6,061,091 A | 5/2000 | Van de Poel et al. | |
| 6,088,612 A * | 7/2000 | Blair | 600/407 |
| 6,339,748 B1 * | 1/2002 | Hiramatsu | 702/159 |
| 6,633,338 B1 | 10/2003 | Pelsue et al. | |
| 6,639,594 B2 | 10/2003 | Zhang et al. | |
| 6,788,411 B1 | 9/2004 | Lebens | |
| 6,956,963 B2 | 10/2005 | Ulrich et al. | |
| 6,975,360 B2 * | 12/2005 | Slatter | 348/370 |
| 7,006,128 B2 | 2/2006 | Xie et al. | |
| 7,058,217 B2 | 6/2006 | Thornber et al. | |
| 7,342,574 B1 * | 3/2008 | Fujioka | 345/175 |
| 7,398,927 B2 * | 7/2008 | Olmstead et al. | 235/454 |
| 7,492,357 B2 * | 2/2009 | Morrison et al. | 345/173 |
| 2001/0012001 A1 * | 8/2001 | Rekimoto et al. | 345/173 |
| 2001/0055006 A1 * | 12/2001 | Sano et al. | 345/175 |
| 2002/0113882 A1 * | 8/2002 | Pollard et al. | 348/239 |

(Continued)

FOREIGN PATENT DOCUMENTS

KR 102001005203 1/2001

(Continued)

OTHER PUBLICATIONS

Dynamic Lighting System for Specular Surface Inspection; R. Seulin, F. Merienne, P. Gorria; Laboratoires Le2i, Univ. de Bourgogne, Le Creusot, France, 71200 (11 pages).

(Continued)

*Primary Examiner*—Sinh Tran
*Assistant Examiner*—Richard M Bemben
(74) *Attorney, Agent, or Firm*—Workman Nydegger

(57) ABSTRACT

An interactive display system that includes an interactive display screen. An illuminator is positioned to illuminate one of the inner or outer surfaces of the display screen. At least two cameras are placed so as to view the illuminated surface of the display screen. Each of at least one of the cameras are positioned such that specular reflections from the illuminator are received by the camera. The images from the different cameras are merged to form a merged image in which specular reflections are reduced or even cancelled.

21 Claims, 3 Drawing Sheets

U.S. PATENT DOCUMENTS

| | | |
|---|---|---|
| 2002/0186221 A1 | 12/2002 | Bell |
| 2005/0162381 A1* | 7/2005 | Bell et al. .................. 345/156 |
| 2005/0245302 A1* | 11/2005 | Bathiche et al. ................ 463/1 |
| 2006/0152741 A1 | 7/2006 | Quist |
| 2006/0202974 A1* | 9/2006 | Thielman .................... 345/175 |

FOREIGN PATENT DOCUMENTS

| KR | 1020040072652 | 8/2004 |
|---|---|---|
| KR | 1020050051554 | 6/2005 |

OTHER PUBLICATIONS

Machine Vision System For Specular Surface Inspection: Use of Simulation Process As A Tool For Design And Optimization; E. Seulin, F. Merienne and P. Gorria; (6 pages).

* cited by examiner

Camera A Image    Camera B Image

SPECULAR REFLECTION REDUCTION USING MULTIPLE CAMERAS

BACKGROUND

The functionality of many computing systems and other devices relies on effective display of information using a display. More recently, the display has also been used in an interactive manner as a direct user input device. For instance, a display might be equipped with touch sensitive resistive and/or capacitive arrays to detect a portion of the display screen being physically contacted.

Some conventional interactive displays use "vision capture" technology in which a camera is positioned behind the display screen, the display screen composed of one or more layers of transparent or semitransparent material. An infrared illuminator is also positioned behind the display screen to illuminate an object in front of or in contact with the display. Illumination light (i.e., light originating from the illuminator) reflected from the object is received by the camera, which takes a picture of the reflected light. The picture is used as an electronic input to the system. Since the placement, size, and brightness of the object in front of the display influences its image taken by the camera, the object may be used to input information into the system.

Some of the illumination light is reflected not off the object, but off of the relatively flat surfaces of the transparent or semi-transparent layer(s) forming the display screen. The result is that the camera will see a specular reflection of relatively strong brightness at a specific area of the display screen. The specular reflection may be so strong that it would be difficult to distinguish any image actually reflected from an input object within the area of the specular reflection. The specular reflection may even saturate the camera in that specific area. The effect is somewhat analogous to the situation in which a person looks downward at a shallow pond on a sunny day. The person might be able to view the bottom of the pond except for the area that is at or close to the sun's blinding reflection.

Accordingly, specular reflections can adversely impact the ability to use an interactive display as input, especially if the input object is positioned at an area of the display screen in which the camera is experiencing a specular reflection.

BRIEF SUMMARY

Although not required, embodiments of the present invention relate to an interactive display system that includes an interactive display screen. An illuminator is positioned to illuminate one of the inner or outer surfaces of the display screen. At least two cameras are placed so as to view the illuminated surface of the display screen. Each of at least one of the cameras are positioned such that specular reflections from the illuminator are received by the camera. The images from the different cameras are merged to form a merged image in which specular reflections are reduced or even cancelled.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The appended drawings are used in order to more particularly describe embodiments of the present invention. Understanding that these drawings depict only typical embodiments of the invention and are not therefore to be considered to be limiting of its scope, the embodiments will be described and explained with additional specificity and detail through the use of the accompanying drawings in which.

DETAILED DESCRIPTION

Embodiments of the present invention extend to an interactive display that includes multiple cameras placed so as to have a view of the inside or outside surfaces of the display screen. An illuminator is also placed to illuminate the viewed display screen surface so that reflected images of objects in front of or in contact with the display screen can be received by the cameras. The areas of specular reflection are different for at least two of the cameras, such that images from one of the cameras can be used to reduce or cancel specular reflection from the other camera.

Figure 1:
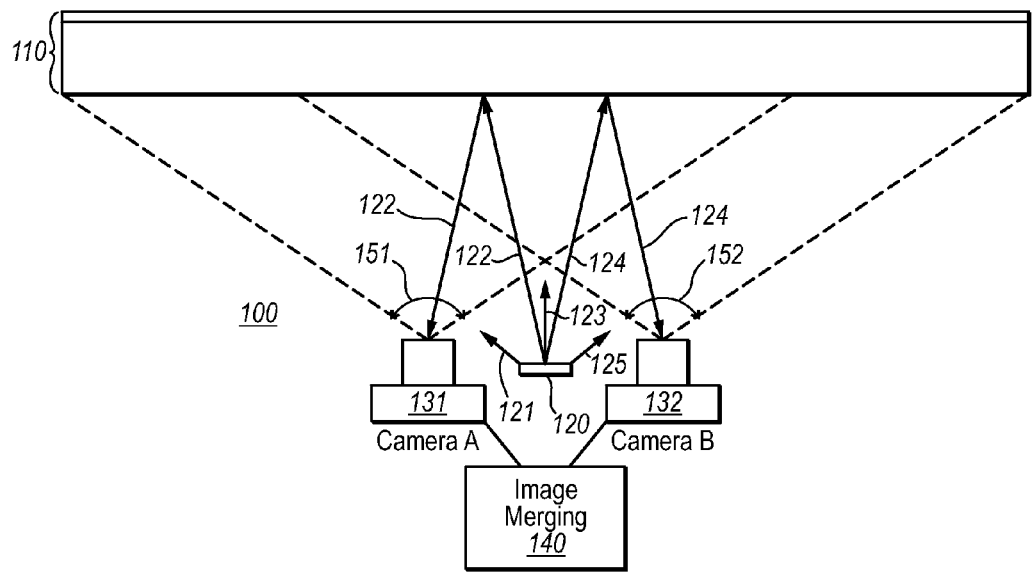
FIG. 1 illustrates an interactive display that shows two cameras and a single illuminator, in which the specular reflection for each of the cameras occurs at a different part of the captured image.

FIG. 1 illustrates a side-view of an interactive display 100 in accordance with one embodiment of the present invention. The interactive display 100 is configured to display images from the outer surface (the top surface as illustrated in FIG. 1) of one or more transparent or semi-transparent layers comprising the display screen 110. However, separate and apart from the display mechanism, which is largely not shown in FIG. 1, the interactive display 100 includes an imaging mechanism. Throughout the description of FIG. 1, the embodiment will be described in which the displayed image would be viewed from the top surface of the display screen 110 as illustrated in FIG. 1. In that case, the top surface of the display screen 110 would be the outer surface of the display screen, whereas the bottom surface of the display screen 110 would be the inner surface of the display screen. However, in other embodiments, the displayed image may be viewed from the bottom surface of the display screen 110. In that case, the bottom surface of the display screen would be the outer surface of the display screen 110, and the top surface of the display screen would be the inner surface of the display screen.

Specifically, in one embodiment, the illuminator 120 is positioned to emit light (hereinafter also referred to as "illumination light") onto the inner surface of the display screen 110. In this description and in the claims, "light" is defined broadly as including any radiated electromagnetic radiation of any frequency, whether visible or otherwise. The illumination light is typically not of the same spectrum as the light being displayed (hereinafter also referred to as "displayed light") so as not to interfere with the display operation. For instance, if the displayed light is in the visible spectrum, the illuminator 120 might emit illumination light primarily in the infrared range or spectrum, or perhaps in the ultraviolet range or spectrum, or in any other non-visible spectrum. In the case of infrared illumination light, the cameras could be limited in spectral range such that they would only see the infrared range of the radiation spectrum. The principles of the present invention are not limited to a display that always operates in an interactive mode of operation. However, while operating in an interactive mode, the illuminator 120 will emit light when imaging objects in front of the display screen.

The illuminator 120 emits illumination light in many directions. Some of the illumination light passes through the display screen 110, but does not interfere with the display operation since it is of a different frequency spectrum than the displayed light. Other illumination light reflects from objects placed on the outer surface (i.e., on or over the top surface in FIG. 1) of the display screen 110, and thus the reflected light represents information about objects in front of the display screen. Yet other illumination light reflects from the flat surfaces of the display screen 110, as and thus does not represent information about objects in front of the display screen, but is simply spectral reflection.

For example, to illustrate the interference of spectral reflection with data acquisition, five rays of illumination light 121, 122, 123, 124 and 125 are illustrated as being emitted from the illuminator 120. The camera 131 receives light within range 151 including ray 122. While much of the light received by camera 131 may represent valid information about objects placed on or in front of the outer surface the display screen 110, the ray 122 represents only specular reflection. Such specular reflection may reduce the ability to perceive objects in front of the display screen in the area of the specular reflection. In some cases, the specular reflection may even saturate the camera in that area of the display screen. Accordingly, it would be difficult for camera 131 to image objects placed on or in front of the display screen 110 if at or near the area of specular reflection.

The camera 132 receives light within range 152. Once again, while much of the light received by camera 132 may represent valid information about objects placed on or in front of the display screen 110, the ray 124 represents only specular reflection. Accordingly, the camera 132 also has an area of specular reflection at or near which it may be difficult to image objects in front of the display screen. However, the area of specular reflection for camera 131 is different than the area of specular reflection for camera 132. That is to say, objects that are more difficult to image by camera 131 due to specular reflection, may be more easily imaged by camera 132. In addition, objects that are more difficult to image by camera 132 due to specular reflection, may be more easily imaged by camera 131. The image merging operation 140 shown in FIG. 1 will be described in further detail below.

Figures 2A, 2B:
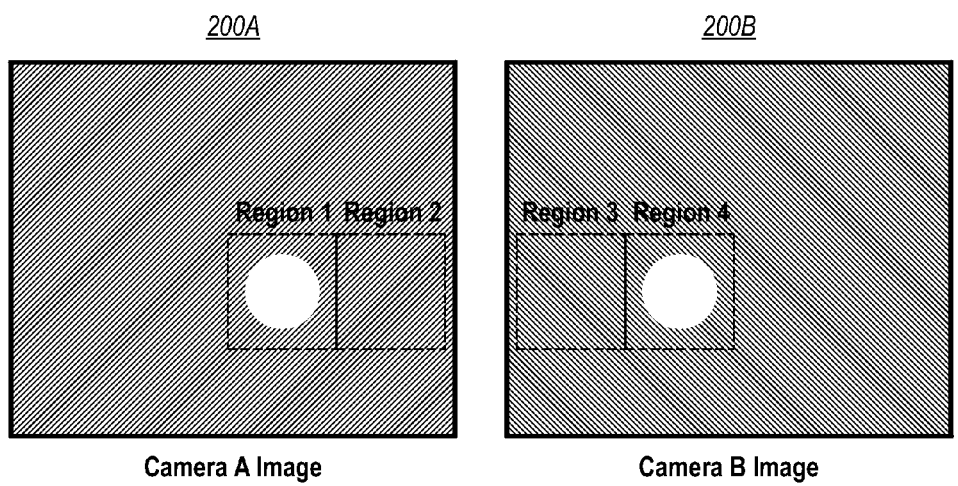
FIG. 2A shows a representation of an image as it might be captured by the first camera of FIG. 1.
FIG. 2B shows a representation of an image as it might be captured by the second camera of FIG. 1.

First, however, FIG. 2A shows a representation of a first image 200A as it might be captured by the camera 131. Region 1 shows an area of specular reflection in the image 200A received by camera 131. FIG. 2B shows a representation of an image 200B as it might be captured by the camera 132. Region 4 in FIG. 2B shows an area of specular reflection in the image 200B received by camera 132. The regions of specular reflection are, however, different for the two cameras. For instance, region 2 of image 200A in FIG. 2A does not contain any specular reflection, but images the same area of the display screen as region 4 of image 200B in FIG. 2B, which does contain a specular reflection. Meanwhile, region 3 of image 200B in FIG. 2B does not contain any specular reflection, but images the same area of the display screen as region 1 of image 200A in FIG. 2A, which does contain a specular reflection.

Figure 3:
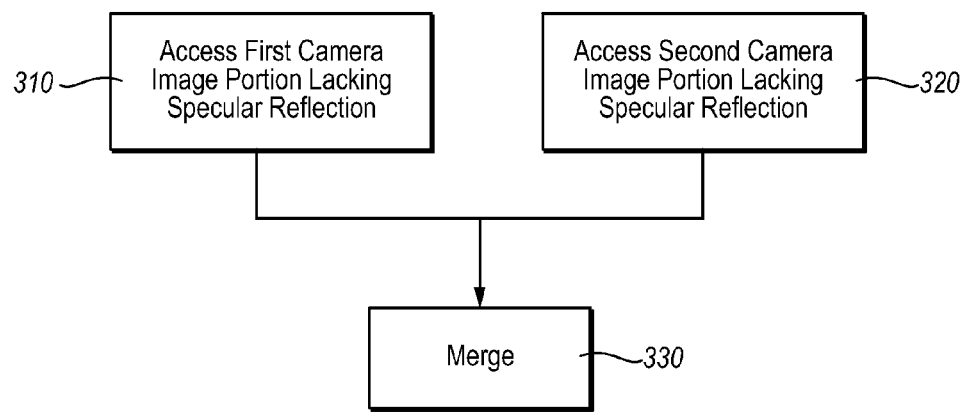
FIG. 3 illustrates a flowchart of a method for the image merging operation to combine images from the two cameras.

Referring back to FIG. 1, the interactive display 100 shows an image merging operation 140 coupled to the two cameras 131 and 132. The image merging operation 140 may be any mechanism or algorithm that combines the images from the two cameras. An example of such a method 300A is illustrated in FIG. 3. The image merging operation accesses a portion of the first image taken by the first camera (act 310), where this first portion lacks specular reflection even though other portions of the image may have specular reflection. The image merging operation also accesses a second portion of the second image taken by the second camera (act 320), where this second portion also lacks specular reflection even though other portions of the second image may have specular reflection. The image merging operation may then merge the two portions (act 330). This method has been discussed very broadly since the principles of the present invention are not limited to a particular type of merging operation. However, for clarification, various examples of image merging will now be described, even though there is no limit to the number of different image merging operations that may be used with the principles of the present invention.

In a first example, perhaps the entire first image 200A is taken except for region 1 containing the specular reflection. As for image 200B, only region 3 is taken. Region 1 of image 200A may then be replaced by region 3 of image 200B to generate a merged image having no specular reflections. Since the range 151 of camera 131 does not cover the full area of the display, perhaps a portion of the right side of image 200B may be appended to image 200A as well.

In a second example, perhaps the entire second image 200B is taken except for region 4 containing the specular reflection. As for image 200A, only region 2 is taken. Region 4 of image 200B may then be replaced by region 2 of image 200A to generate a merged image having no specular reflections. Since the range 152 of camera 132 does not cover the full area of the display, perhaps a portion of the left side of image 200A may be appended to image 200B as well. However, as previously mentioned, image "merging" may involve any process in which data from multiple images are used to formulate a single image.

In these examples, specular reflection is eliminated. However, there may be embodiments in which both cameras have overlapping areas of specular reflection. For instance, an object placed in front of the display may not be imaged at all if it resides in an area of specular reflection for both cameras. While this is certainly not ideal, the principles of the present invention may be applied in that circumstance as well to reduce specular reflection. For instance, a portion of an image for the second camera may be used to cancel only a part of the specular reflection received by the first camera.

Figure 4:
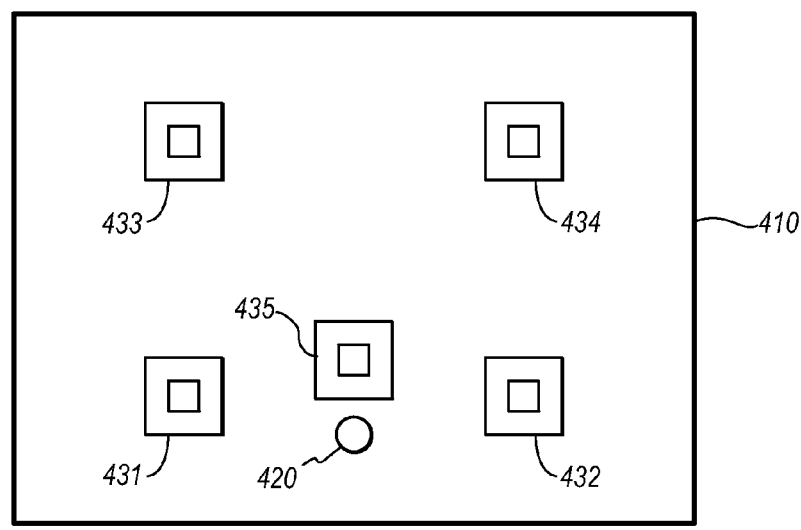
FIG. 4 illustrates a top view of a specific five camera embodiment of the interactive display of FIG. 1.

FIGS. 1 and 2 show a simple embodiment in which two cameras are used with one illuminator. However, the principles of the present invention are not limited to such an embodiment. FIG. 4, for example, shows a top view of a five camera system 400 operating with a single illuminator. Each of the cameras 431 through 435 and the illuminator 420 are positioned behind the display screen 410 constituting the display surface. Each camera 431 through 434 is positioned to capture images reflected from the illuminator 420 for a particular quartile of the imaging area. For example, camera 431 captures images for the lower left quartile, camera 432 for the lower right quartile, camera 433 for the upper left quartile, and camera 434 for the upper right quartile. Cameras 431 and 432 are positioned such that they each capture specular reflection caused by illuminator 420. Since illuminator 420 is positioned well off-center from the horizontal mid-point of the display screen, cameras 433 and 434 are positioned so as to avoid specular reflection from the illuminator 420. Camera 435 (also called herein an "overlapping camera") is positioned to capture without specular reflection the areas of cameras 431 and 432 that have specular reflection. Accordingly, the final image may be free of specular reflection by merging all four images from cameras 431 through 434, and by replacing the specular reflection areas with image portions captured by camera 435.

Figure 5:
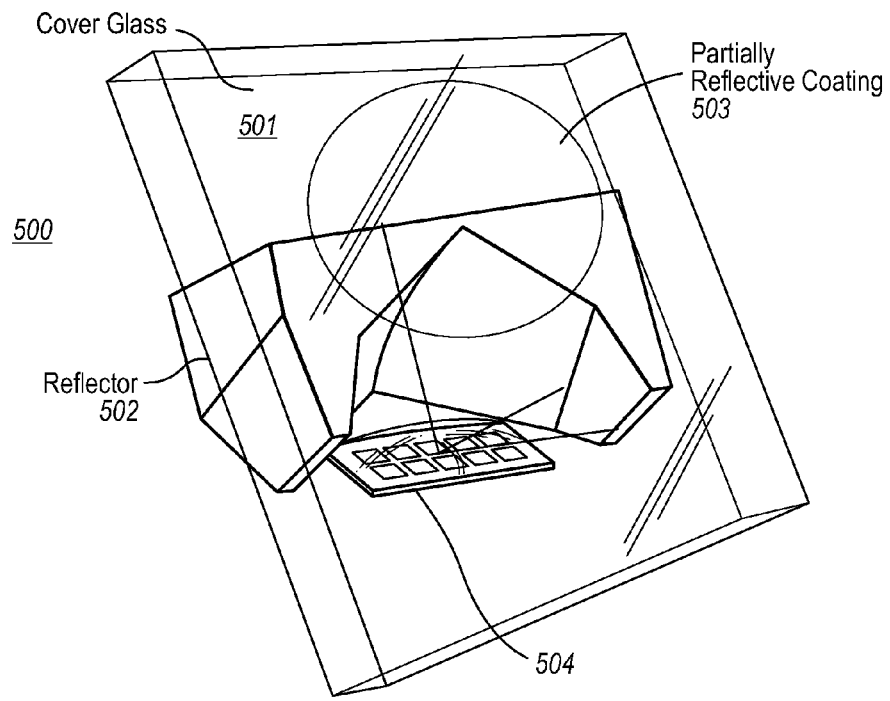
FIG. 5 illustrates an illumination module that may be used for the illuminator of FIG. 4.

In the example of FIG. 4, the illuminator 420 is placed off-center. FIG. 5 illustrates an illumination module 500 that may be used for the illuminator 420 of FIG. 4. The LED array module 504 serves as the light source. In order to properly redirect the light such that an approximately uniform irradiance distribution is received at the display screen, a reflector 502 and a partially reflective coating 503 are used. The partially reflective coating 503 is positioned on a cover glass 501 for structural support. Some of the light emitted from the LED array module 504 is reflected by the reflector 502 with some light being attenuated by the partially reflective coating 503. The shape of the reflector 502 may be obtained empirically and/or through computer simulation and may differ depending on the irradiance distribution of the LED array module 504 as well as the positioning of the illumination module behind the display screen. The use of shaped reflectors to redirect light is well known in the art.

Figure 6:
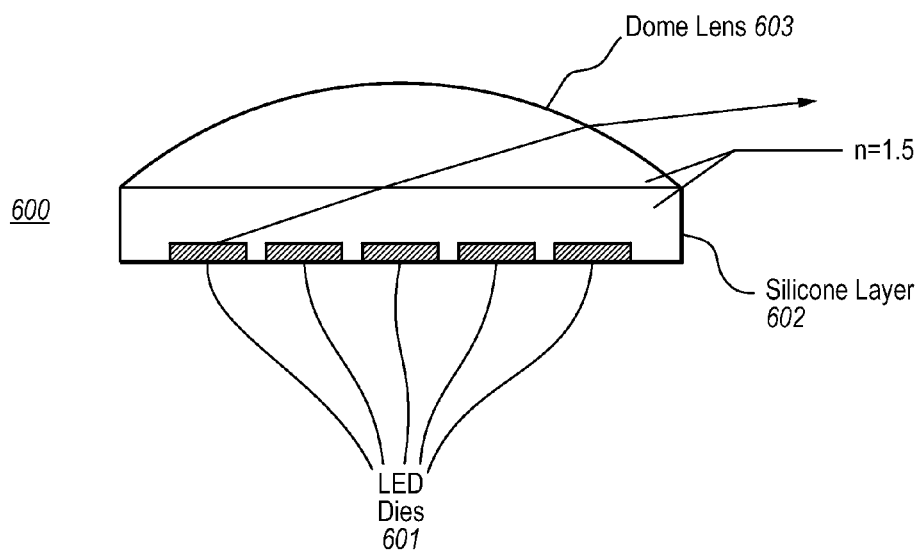
FIG. 6 illustrates a light source that may be used for the light source in the illuminator of FIG. 5.

FIG. 6 illustrates an example structure 600 of the LED array module 504 of FIG. 5. An array of Light Emitting Diode chips 601 are encapsulated in a layer of silicone 602. In addition, a dome lens 603 (also formed of silicone or perhaps epoxy, glass, or plastic) is positioned on top of the silicone layer 602. The silicone layer 602 and the dome lens 603 have an index of refraction of approximately 1.5, whereas the surrounding material (e.g., air) has an index of refraction of approximately 1.0. Without the dome lens 603, a lot of the light emitted by the LED diode array 601 would be reflected back into the silicone layer 602 through internal reflection. With the presence of the dome lens 603, the illumination light is permitted to more efficiently pass into the surrounding air, by deceasing the amount of light which experiences total internal reflection, and thus to be emitted by the illumination module to irradiate light onto the display screen.

Accordingly, embodiments of a multi-camera interactive display have been described in which multiple cameras are used to reduce or cancel specular reflections. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An interactive display system comprising:
   a display screen comprising one or more display layers;
   an illuminator positioned at a single location so as to illuminate one of the inner surface or outer surface of the display screen from the single location, the illuminator causing at least a first specular reflection that is detected by a first camera and a second specular reflection that is detected by a second camera;
   the first camera being positioned so as to view and capture a first image of at least a first area and a second area of the illuminated surface of the display screen, using light emitted from the illuminator, wherein the first image captured by the first camera includes:
      a first image portion that corresponds to the first area of the illuminated surface and that includes the first specular reflection that is caused by light from the illuminator, and
      a second image portion that corresponds to the second area of the illuminated surface and that is free from the first and second specular reflection caused by light from the illuminator;
   the second camera being positioned so as to view and capture a second image of at least the first area and the second area of the illuminated surface of the display screen, using light emitted from the illuminator, wherein the second image captured by the second camera includes:
      a third image portion that corresponds to the second area of the illuminated surface and that includes the second specular reflection that is caused by light from the illuminator, and
      a fourth image portion that corresponds to the first area of the illuminated surface and that is free from the first and second specular reflection caused by light from the illuminator; and
   an image merging mechanism configured to combine the first and second images from the first camera and from the second camera, respectively, in such a way that at least the first specular reflection is at least reduced in a merged image in comparison with the first specular reflection captured in the first image by the first camera.

2. The interactive display system in accordance with claim 1, further comprising:
   a third camera positioned so as to view the illuminated surface of the display screen.

3. The interactive display system in accordance with claim 2, wherein the illuminator is positioned such that the third camera is enabled to capture a third image which is free from any specular reflection caused by the illuminator when the illuminator is illuminating.

4. The interactive display system in accordance with claim 3, wherein the illuminator is positioned off-center with respect to the one or more display layers.

5. The interactive display system in accordance with claim 2, wherein the third camera is positioned such that when the illuminator is illuminated, a third specular reflection occurs at a third area, which is detected by and captured by the third camera in a third image, the third area being different than the first and second areas.

6. The interactive display system in accordance with claim 5, further comprising:
   a fourth and fifth camera positioned so as to view the illuminated surface of the display screen.

7. The interactive display system in accordance with claim 1, wherein the illuminator emits light primarily in the infrared range.

8. The interactive display system in accordance with claim 1, wherein the image merging mechanism is configured to combine the first and second images from the first and second cameras by:
   accessing the second image portion taken by the first camera, the second image portion lacking any specular reflection even though the first camera receives the first specular reflection;
   accessing the fourth image portion taken by the second camera, the fourth image portion lacking any specular reflection even though the second camera receives the second specular reflection; and
   merging the second image portion from the first image and the fourth image portion from the second image.

9. The interactive display system in accordance with claim 8, wherein the second image portion and the fourth image portion, when combined, represent substantially all of the displayable area of the display screen.

10. The interactive display system in accordance with claim 8, wherein the first image portion and the second image portion are different is size and wherein a majority of the first image portion corresponds to an area in the second image in which there is a specular reflection and which corresponds to the fourth image portion.

11. The interactive display system in accordance with claim 10, wherein the first portion of the first image is rectangular.

12. The interactive display system of claim 8, wherein image merging mechanism is further configured to combine the first and second images from the first and second cameras by at least appending the merged image with a fifth image portion corresponding to an area of the display screen that is within photographic range of the second camera but which is outside of photographic range of the first camera.

13. The interactive display system in accordance with claim 1, wherein the illuminator emits light primarily in the ultraviolet spectrum.

14. The interactive display system in accordance with claim 1, wherein the illuminator is configured to illuminate during substantially all of the time that the interactive display is in an interactive mode of operation.

15. An image merging mechanism for use with an interactive display system that includes one or more display layers, a first camera positioned so as to view an illuminated surface of the one or more display layers at a first position such that when an illuminator that is positioned at a particular location is illuminated a specular reflection occurs at a specular reflection area of an image as captured by the first camera, a second camera positioned so as to view an illuminated surface of the one or more display layers at a second position such that when the illuminator is illuminated from the particular location the second camera is able to view and capture at least a portion of the specular reflection area of the first camera without capturing the specular reflection, the image merging mechanism configured to perform the following act:
   an act of combining images from the first and second camera such that the specular reflection is at least reduced as compared to a level of the specular reflection captured by the first camera.

16. The image merging mechanism in accordance with claim 15, wherein the act of combining images comprises:
   accessing a first portion of a first image taken by the first camera, the first portion of the first image lacking a specular reflection even though the first camera receives a specular reflection;
   accessing a second portion of a second image taken by the second camera, the second portion of the second image lacking a specular reflection; and
   merging the first portion of the first image and the second portion of the second image.

17. The image merging mechanism in accordance with claim 16, wherein the first portion of the first image and the second portion of the second image, when combined, represent substantially all of the displayable area of the one or more display layers.

18. The image merging mechanism in accordance with claim 16, wherein a majority of the first portion of the first image corresponds to an area in the second image in which there is a specular reflection.

19. An interactive display system comprising:
   a display screen comprising one or more display layers;
   an illuminator positioned at a particular location to illuminate one of the inner or outer surfaces of the display screen layers;
   a first camera positioned so as to view the illuminated surface of the one or more display screen layers at a position such that when the illuminator is illuminated, a specular reflection occurs at an area of an image as captured by the first camera;
   a second camera positioned so as to view the illuminated surface of the one or more display screen layers at a position such that when the illuminator is illuminated, a specular reflection occurs at a second portion of images captured by the second camera, the second camera capturing images reflected from the illuminator at a second region of the one or more display screen layers;
   a third camera positioned so as to view the illuminated surface of the one or more display screen layers at a position such that the third camera captures images reflected from the illuminator at a third region of the one or more display screen layers;
   a fourth camera positioned so as to view the illuminated surface of the one or more display screen layers at a position such that the fourth camera captures images reflected from the illuminator at a fourth region of the one or more display screen layers; and
   a fifth camera, comprising an overlapping camera positioned so as to view the illuminated surface of the one or more display screen layers at a position such the overlapping camera captures images from areas of specular reflection for the first and second cameras, without itself capturing specular reflections for those corresponding areas.

20. The interactive display in accordance with claim 19, wherein the illuminator emits light primarily in the ultraviolet spectrum.

21. The interactive display in accordance with claim 19, wherein the illuminator emits light primarily in the infrared spectrum.

* * * * *